Patented Feb. 21, 1933

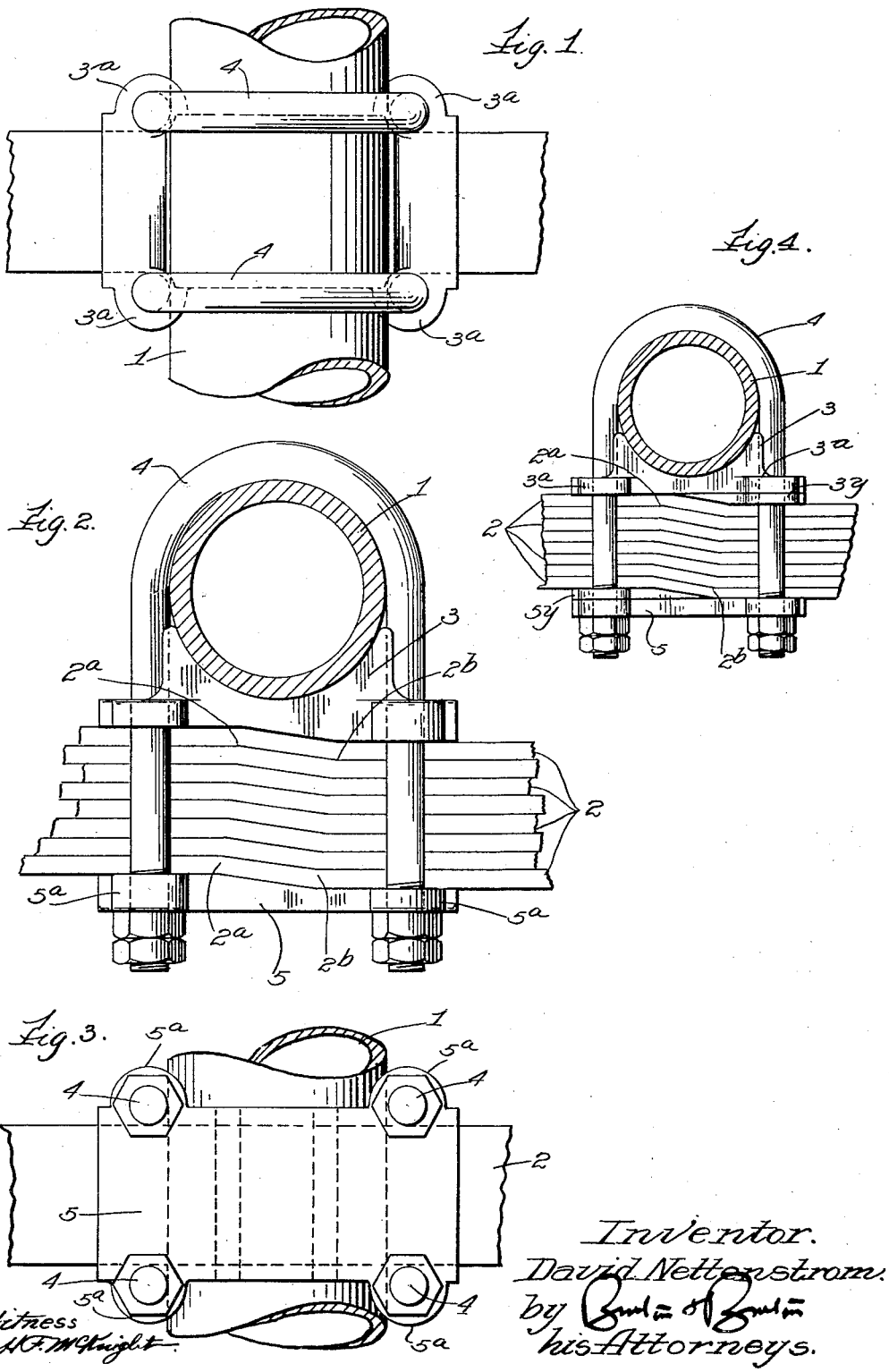

1,898,204

UNITED STATES PATENT OFFICE

DAVID NETTENSTROM, OF CHICAGO, ILLINOIS

VEHICLE SPRING PERCH

Application filed November 12, 1928. Serial No. 318,706.

The purpose of this invention is to provide an improved perch or mount for vehicle springs, by means of which the leaves of the spring retain their maximum strength and flexibility, and are firmly held against longitudinal shifting with respect to each other and the support. A further object is to provide an improved construction, that is, durable, simple and capable of economical manufacture. It consists in certain features and elements of construction, herein shown and described, as indicated by the claims.

In the drawing:—

Figure 1 is a fragmentary plan view of a spring and axle with a spring mount embodying the present invention.

Figure 2 is a fragmentary view in side elevation.

Figure 3 is a fragmentary bottom view of a spring and an axle with the mount applied thereto.

Figure 4 is a side elevation of a modified construction.

To carry out certain vehicle designs, the springs are mounted either above or below the axle, to suit the conditions, and for the purpose of illustration, my improved spring mount is shown in the drawing with the spring carried below the axle. In the drawing, 1 indicates an axle or axle housing which yieldingly supports the vehicle body through the medium of leaf springs, each of which is composed of a plurality of leaves, 2. The mount or perch for each spring is usually, though not always, located adjacent the longitudinal center of the spring to secure correct balancing and proper flexibility. The leaves of the spring are firmly held in place against a saddle or upper clamping member, 3, which is seated against the under side of the axle, by a pair of transversely spaced U-bolts, 4, which extend around the axle and downwardly through the lugs, $3^a$ of the saddle, 3, and the lugs, $5^a$, of the lower clamping member, 5, which is in supporting engagement with the lower leaf of the spring. These U-bolts are positioned so as to extend closely adjacent the edges of the spring leaves and thus serve to prevent lateral shifting thereof. It will be understood that the saddle or upper clamping member may, for convenience, be formed as an integral part of the axle or axle housing.

Each of the spring leaves is bent at two parallel spaced planes, adjacent the longitudinal center, and indicated at $2^a$ and $2^b$, forming an off-set, inclined portion, $2^c$, which permits the leaves of the spring to be arranged in nested relation with the off-set portion of one leaf in contact with the off-set portion of a contiguous leaf. This bending of the leaves may be accomplished in a suitable machine, when the leaves are cold, without impairing strength or flexibility. Thus when the leaves of a spring are clamped tightly together, with the off-set portions between the legs of the U-bolts, these off-set portions act as wedges and prevent any of the leaves from shifting longitudinally with respect to the others. The clamp members, 3 and 5, are formed to the contour of the upper and lower leaves of the spring, and are provided with inclined wedging surfaces, $3^c$ and $5^c$, respectively, for co-acting with the off-set portion, $2^c$, of these upper and lower leaves, for firmly securing the entire spring to the axle; the wedging effect between these clamping members and the outer leaves serving to prevent longitudinal shifting of the spring with respect to the axle.

In the modified construction shown in Figure 4, the upper and lower clamping members $3^w$ and $5^w$, are formed with off-set lugs, $3^x$ and $5^x$, respectively, to receive the U-bolts, 4. The surfaces of the clamping members adjacent the spring are flat, and have removable adapter plates, $3^y$ and $5^y$, mounted thereon and intermediate said clamp members and the spring, to provide a uniform clamping thickness between the legs of the U-bolts. The adapter plates are formed with inclined wedging surfaces, $3^z$ and $5^z$, respectively, for co-acting with the off-set portion $2^c$, of the adjacent leaf spring, which arrangement also prevents longitudinal shifting of the spring with respect to its mount. This modified construction is especially suited for replacement work where an entire spring is to be installed, wherein the adapter plates permit using the regular top and bottom clamping plates, as when the clamping member, saddled on the axle, is an integral part thereof.

As far as I am aware, the general practice is to secure the leaves of a spring together (to prevent shifting with respect to each other) by means of a rivet or bolt which necessitates heating each leaf, then punching a hole therein slightly larger than the size of the rivet or bolt. This, of course, impairs the flexibility of the spring and decidedly reduces its strength at this point; because of such construction the spring leaves frequently break at this place of connection. Furthermore, the tendency of the spring leaves to weave, causes enlargement of the holes, thus permitting excessive movement in flexing, which sometimes causes shearing of the rivet or bolt. In my improved spring perch I have rectified these disadvantages of prior constructions and have secured a simple, durable arrangement which insures prolonged life of each leaf, by maintaining its maximum strength and flexibility. Furthermore, my improved construction permits quick and easy replacement of a leaf when the occasion necessitates.

I claim:—

1. In combination with a support, a leaf spring having each of its leaves formed with parallel offset portions, connected by a straight inclined portion, said leaves being arranged in nested relation with the surface of the inclined portions co-operating with the inclined surfaces of the contiguous leaves for preventing shifting of one with respect to the other, and clamping means carried by the support, including an upper member and a lower member for engaging the top and bottom leaves respectively, said clamp members each having two parallel offset portions, connected by an inclined portion adapted for co-acting with corresponding surfaces of the upper and lower leaves for securing said spring against longitudinal movement.

2. A leaf spring comprising a plurality of leaves each formed with substantially parallel offset portions connected by a straight portion which is inclined oppositely from the connected portions respectively, so that the connecting portion slopes downwardly from the one and upwardly from the other of said connected portions.

3. A leaf spring comprising a plurality of leaves each formed with substantially parallel offset portions connected by a straight portion which is inclined oppositely from the connected portions respectively, so that the connecting portion slopes downwardly from one and upwardly from the other, the connecting portions of the leaves being all of the same length so that said leaves may be assembled in nested relation with said connecting portions super-imposed upon each other.

4. A leaf spring comprising a plurality of leaves each formed with substantially parallel offset portions connected by a straight portion which is inclined oppositely from the connected portions respectively, so that said connecting portion slopes downwardly from one and upwardly from the other, the connecting portion being of substantially uniform thickness throughout its length.

5. A leaf spring comprising a plurality of leaves each formed with substantially parallel offset portions connected by a straight portion which is inclined oppositely from the connected portions respectively, so that said connecting portion slopes downwardly from one and upwardly from the other, the connecting portion being of substantially uniform thickness throughout its length, and of the same thickness as the adjoining portions of the leaf.

6. In combination with a leaf spring comprising a plurality of leaves each formed with substantially parallel offset portions connected by an intermediate straight portion which is inclined oppositely from the connected portions respectively, so that the connecting portion slopes downwardly from one and upwardly from the other, clamping means for holding said leaves assembled with said connecting portions super-imposed upon each other, said means including a member having substantially parallel surfaces to engage said parallel portions of the outermost leaf with an inclined surface connecting them dimensioned to engage said connecting portion of said leaf, and adjustable means for holding said member firmly pressed against the assembled leaves.

7. In combination with a leaf spring comprising a plurality of leaves each formed with substantially parallel offset portions connected by an intermediate straight portion which is inclined oppositely from the connected portions respectively, so that the connecting portion slopes downwardly from one and upwardly from the other, clamping means for holding said leaves assembled with said connecting portions super-imposed upon each other, said means including clamping members held firmly against the outermost leaves respectively of the assembly, and each having substantially parallel offset surfaces positioned to engage the offset portions of the leaf and connected by an inclined surface dimensioned to fit against the inclined connecting portion of the leaf, and means forcibly urging said clamping members toward each other to grip the spring leaves and prevent longitudinal shifting of the latter with respect to each other and the clamping device.

In testimony whereof, I have hereunto set my hand at Chicago, Illinois, this 8th day of October, 1928.

DAVID NETTENSTROM.